(12) United States Patent
Saxena et al.

(10) Patent No.: US 10,132,323 B2
(45) Date of Patent: Nov. 20, 2018

(54) COMPRESSOR ENDWALL TREATMENT TO DELAY COMPRESSOR STALL

(71) Applicant: General Electric Company, Schenectady, NY (US)

(72) Inventors: Swati Saxena, Schenectady, NY (US); Andrew Breeze-Stringfellow, Montgomery, OH (US); Rajkeshar Vijayraj Singh, Clifton Park, NY (US); Tsuguji Nakano, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 644 days.

(21) Appl. No.: 14/870,300

(22) Filed: Sep. 30, 2015

(65) Prior Publication Data
US 2017/0089217 A1    Mar. 30, 2017

(51) Int. Cl.
*F04D 27/02* (2006.01)
*F02C 3/04* (2006.01)

(52) U.S. Cl.
CPC .............. *F04D 27/02* (2013.01); *F02C 3/04* (2013.01); *F05D 2220/32* (2013.01)

(58) Field of Classification Search
CPC .......... F01D 25/02; F01D 25/14; F01D 25/24; F01D 11/08; F05D 2220/32;
(Continued)

(56) References Cited

U.S. PATENT DOCUMENTS 6,591,613 B2    7/2003  Simunek
6,619,909 B2    9/2003  Barnett et al.
(Continued)

FOREIGN PATENT DOCUMENTS

JP    5142886 B2    2/2013

OTHER PUBLICATIONS

"Glacier facility to help certify large aero engines against icing", National Research Council Canada, http://www.nrc-cnrc.gc.ca/eng/achievements/highlights/2011/glacier_engines.html, Feb. 1, 2011, retrieved Jun. 9, 2014.
(Continued)

*Primary Examiner* — Dwayne J White
*Assistant Examiner* — Danielle M Christensen
(74) *Attorney, Agent, or Firm* — GE Global Patent Operation; Nitin Joshi

(57) ABSTRACT

A compressor is provided including a casing, a hub, a flowpath, a plurality of blades defining a plurality of axially extending compressor stages and an endwall treatment formed in the casing on at least two downstream most stages of the plurality of compressor stages. The remaining stages of the plurality of compressor stages located upstream of the at least two downstream most stage are devoid of any endwall treatment. Each of the endwall treatments faces a tip of each blade in the at least two downstream most stages. The tip of each blade and the endwall treatment are configured to move relative to each other. The endwall treatment formed in the casing on at least two downstream most stages of the plurality of compressor stages is configured to extend a stall margin to delay stall due to ice ingestion. A method and engine application are disclosed.

20 Claims, 7 Drawing Sheets

(58) Field of Classification Search
CPC ..... F05D 2220/3218; F05D 2220/3219; F02C 3/04; F04D 27/02; F04D 27/0207; F04D 27/0215

See application file for complete search history.

(56) References Cited

U.S. PATENT DOCUMENTS

| | | |
|---|---|---|
| 6,786,033 B2 | 9/2004 | Simunek |
| 6,868,721 B2 | 3/2005 | Szilder |
| 7,502,717 B2 | 3/2009 | Elpern et al. |
| 8,177,494 B2 | 5/2012 | Ward et al. |
| 8,337,146 B2 | 12/2012 | Yu |
| 2007/0234704 A1 | 10/2007 | Moniz et al. |
| 2009/0108134 A1 | 4/2009 | Thodiyil et al. |
| 2014/0109589 A1 | 4/2014 | Pritchard, Jr. et al. |
| 2014/0245747 A1 | 9/2014 | Pritchard, Jr. et al. |
| 2016/0222973 A1* | 8/2016 | Reynolds ............... F04D 27/02 |

OTHER PUBLICATIONS

"Fire and Ice: Software Fix Tackles Rare and Poorly Understood Icing Inside the Hot Core of a Jet Engine", GE Reports, http://www.gereports.com/post/75377161974/fire-and-ice-software-fix-tackles-rare-and-poorly, Nov. 27, 2013.

"Russia investigates serious engine icing incident on Boeing 747-800", Aviation Safety Network, http://news.aviation-safety.net/2013/08/20/russia-investigates-serious-engine-icing-incident-on-boeing-747-800/20/, Aug. 20, 2013.

Giacche et al., "Circumferentially Varying Axial Compressor Endwall Treatment for Controlling Leakage Flow Therein", U.S. Appl. No. 114/572,119, filed Dec. 16, 2014.

Jothiprasad et al., "Compressor End-Wall Treatment With Multiple Flow Axes", U.S. Appl. No. 14/556,315, filed Dec. 1, 2014.

Yoon et al., "Axial Compressor Endwall Treatment for Controlling Leakage Flow Therein", U.S. Appl. No. 14/556,452, filed Dec. 1, 2014.

Mallina et al., "Compressor End-Wall Treatment Having a Bent Profile", PCT Patent Application Serial No. PCT/US2014/069433, filed Dec. 10, 2014.

* cited by examiner

COMPRESSOR ENDWALL TREATMENT TO DELAY COMPRESSOR STALL

BACKGROUND

The present invention relates to a compressor, and more particularly to an endwall treatment disposed in a casing of such compressor to provide a delay in compressor stall.

Compressors used in engines such as a gas turbine, may include a plurality of stages arranged along a length of the compressor. Each stage may include a hub and a plurality of rotor blades arranged about a circumference of the hub. In addition, each stage may further include a plurality of stator blades, disposed alternately to the plurality of rotor blades and arranged about a circumference of a casing of the compressor.

During operation of such gas turbine, the hub of the compressor may be rotated at high speed by a turbine, such that a fluid is continuously induced into the compressor. The fluid is accelerated by the rotating rotor blades and swept rearwards onto the adjacent rows of the stator blades. At each stage, the rotor blade and/or stator blade increases pressure of the fluid. The operating point at which the compressor starts operating in an unstable condition may be referred to as the stall point of the compressor.

Rain, hail and ice-crystal ingestion are known to occur over the entire range of a flight envelope. Cases of in-flight thrust loss events due to engine icing have been reported during cruise conditions at high altitudes (e.g. 10.000 ft.) and especially in sub-tropical regions. When engines operate in icing conditions, ice may accumulate on the low pressure compression system of the engine. More specifically, if such engines are operated within icing conditions at low power for extended periods of time, ice accumulation within the engine may be significant. Accumulated ice in low pressure compression system may shed and enter high pressure compression system and cause compressor instability including compressor surge, partial or total thrust loss, or power roll-backs with little or virtually no warning.

Engine core ice accretion is a complex process involving ice sticking to hot metal surface and acting like a heat sink. Conventional procedures turn on stall mitigation techniques when ice is detected at the compressor exit. More particularly, in an icing condition, a transient bleed valve (TBV) is opened upon ice detection at the compressor exit to eject the ice crystal buildup before it enters the core engine. During such event, the TBV at the compressor exit is opened to bleed air out thus reducing the compressor exit pressure. This results in reduced compressor capability to compress air and hence reduction in overall thrust generated by turbine. The opening of the TBV typically reduces the flow and engine operating line. This results in increased compressor stall margin and delays a stall event resulting in undesirable thrust loss.

Prior attempts to increase the operating range and delay the stall margin in an icing condition have included flow control based techniques such as plasma actuation and suction/blowing near a blade tip. However, such attempts may significantly increase complexity and weight of the compressor. Other attempts include endwall treatments such as circumferential grooves, axial grooves, and the like. Early attempts on such endwall treatments have a substantial impact on design point efficiency with very minimal benefit in delaying the stall margin of the compressor.

Thus, there is a need for a compressor in which during an icing condition thrust loss is avoided and compressor stall is delayed. In addition, there is a need for a method for improving the stall margin of a compressor during an icing condition.

BRIEF DESCRIPTION

In an embodiment, a compressor including an endwall treatment to delay compressor stall is disclosed. The compressor includes a casing, a hub, a flow path formed between the casing and the hub, a plurality of blades positioned in the flow path and defining a plurality of axially extending compressor stages and an endwall treatment formed in the casing on at least two downstream most stages of the plurality of compressor stages. Each of the endwall treatments faces a tip of each blade in the at least two downstream most stages. The tip of each blade and the endwall treatment are configured to move relative to each other. The remaining stages of the plurality of compressor stages located upstream of the at least two downstream most stages are devoid of any endwall treatment. The endwall treatment is configured to extend a stall margin to delay stall due to ice ingestion.

In an embodiment, method of delaying compressor stall in a compressor is disclosed. The method including introducing a fluid flow along a flow path formed between a casing and a hub of a compressor and extracting a portion of the fluid flow into an endwall treatment formed in the casing of each of at least two rear stages of the plurality of compressor stages. The compressor further comprises a plurality of blades positioned in the flow path and defining a plurality of axially extending compressor stages. Each of the endwall treatments faces a corresponding tip of each blade in the two rear stages. The tip of each blade and the corresponding endwall treatment are configured to move relative to each other. The remaining stages of the plurality of compressor stages located upstream of the at least two rear stages are devoid of any endwall treatment. The endwall treatment is configured to extend a stall margin to delay stall due to ice ingestion.

In another embodiment, an engine a compressor including an endwall treatment to delay compressor stall is disclosed. The engine including a compressor, a combustor and a turbine. The compressor, the combustor, and the turbine are configured in a downstream axial flow relationship. The compressor including a casing, a hub, a flow path formed between the casing and the hub, a plurality of blades positioned in the flow path and defining a plurality of compressor stages extending axially, an endwall treatment formed in the casing on a downstream most stage of the plurality of compressor stages and an endwall treatment formed in the casing on a compressor stage immediately upstream from the downstream most stage of the plurality of compressor stages. The endwall treatment formed in the casing on a downstream most stage of the plurality of compressor stages faces a tip of the blade in the downstream most stage. The endwall treatment and blades configured to move relative to each other. The endwall treatment formed in the casing on a compressor stage immediately upstream from the downstream most stage of the plurality of compressor stage faces a tip of the blade in the stage immediately upstream from the downstream most stage. The endwall treatment and blades configured to move relative to each other. The remaining stages of the plurality of compressor stages located upstream of stage immediately upstream from the downstream most stage are devoid of any endwall treatment. The endwall treatment is configured to extend a stall margin to delay stall due to ice ingestion.

DRAWINGS

These and other features and aspects of embodiments of the present technology will become better understood when the following detailed description is read with reference to the accompanying drawings in which like characters represent like parts throughout the drawings, wherein.

Figure 6:
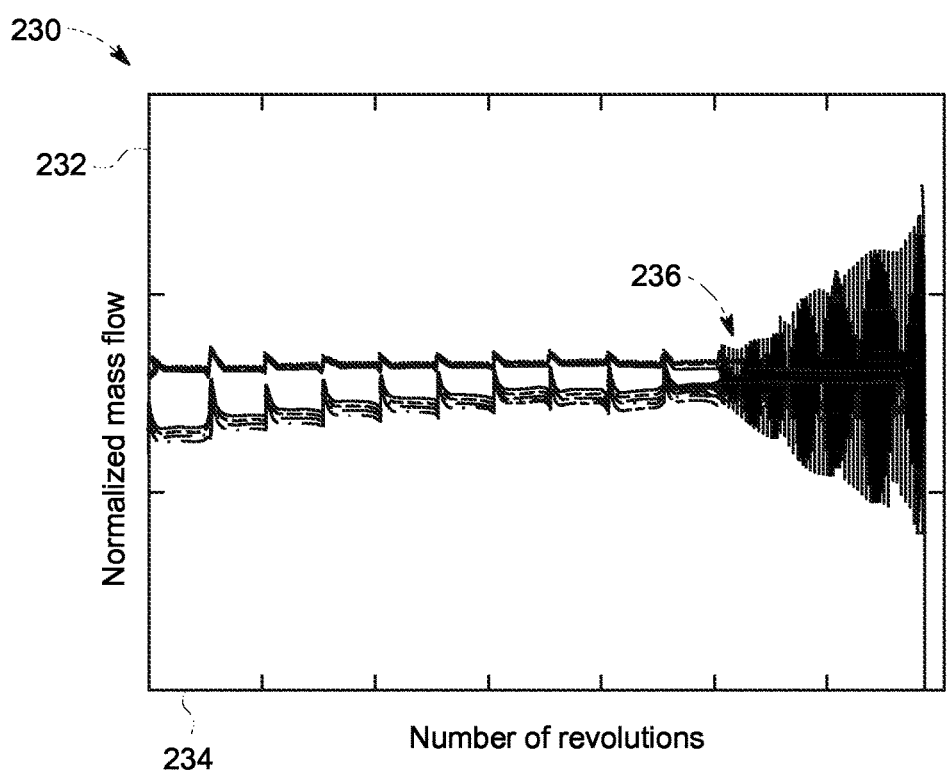
Figure 7:
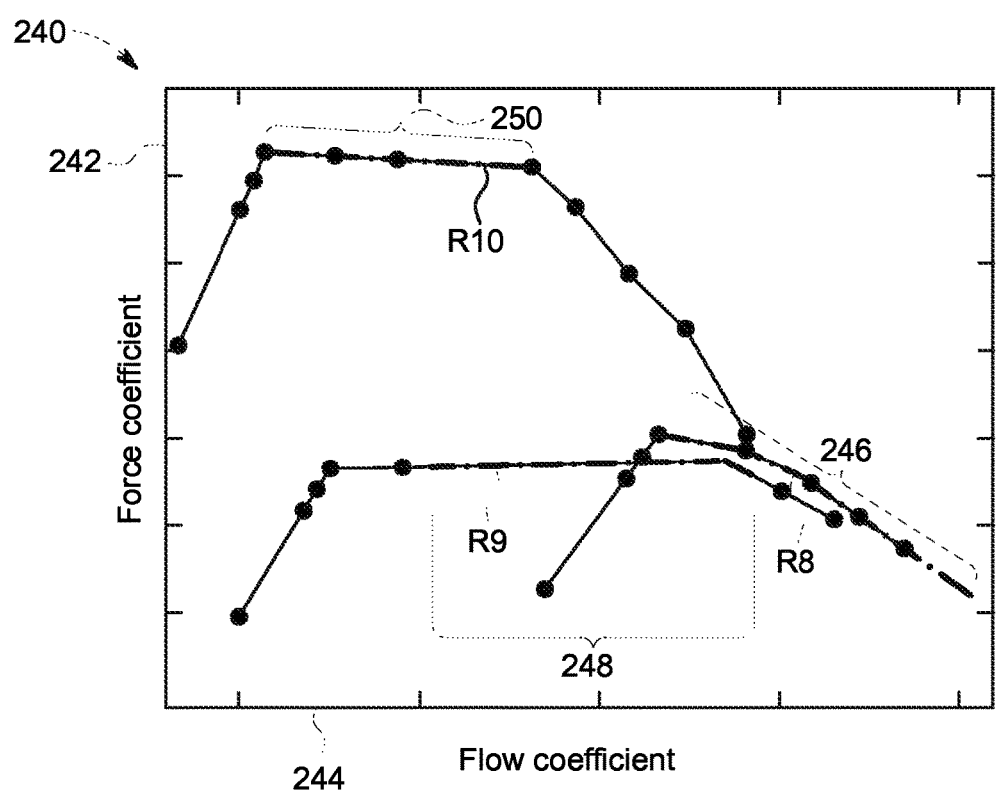

FIG. 6 is a graphical representation illustrating icing stall simulation results with casing treatments on last two rotors in a compressor including an endwall treatment as disclosed in accordance with one or more embodiments shown or described herein; and FIG. 7 is a graphical representation illustrating transient compressor stage-matching due to icing in a compressor including an endwall treatment as disclosed in accordance with one or more embodiments shown or described herein.

DETAILED DESCRIPTION

Embodiments discussed herein disclose an improved compressor for deployment in engines such as a gas turbine, a steam turbine, and the like. The compressor may be an axial flow compressor and according to one embodiment such compressor includes an endwall treatment on selected downstream compressor stages, and in particular on at least two downstream most stages, and wherein the remaining stages of a plurality of compressor stages located upstream of the at least two downstream most stages are devoid of any endwall treatment to allow the compressor to operate with larger amount of ingested water/ice/hail as compared to baseline geometry and thus delaying and improving a stall margin with minimal penalty on design point efficiency of the compressor. In one embodiment of the present disclosure such endwall treatment on the at least two downstream/rear compressor stages is formed in a casing of the compressor, and faces a tip of each blade among a plurality of blades positioned in a flow path of the compressor. The present disclosure provides a novel use of such endwall treatments on selected downstream/rear stages of the compressor to derive maximum benefit in delaying stall in case of water/hail/icing or ice-shed events. For purposes of this disclosure, the 2-3 compressor stages at the front of the compressor are referred to herein as the upstream or front compressor stages. The 2-3 compressor stages at the rear of the compressor are referred to as the downstream or rear compressor stages. The remaining compressor stages located between the upstream and downstream stages are referred to herein as intermediate stages. The rear stages of the compressor are known to initiate stall in case of wet conditions. Increasing the stall margin with the endwall treatments in the two rear stages as disclosed herein allows the compressor to operate with larger amount of ingested water/ice/hail.

Figure 1:
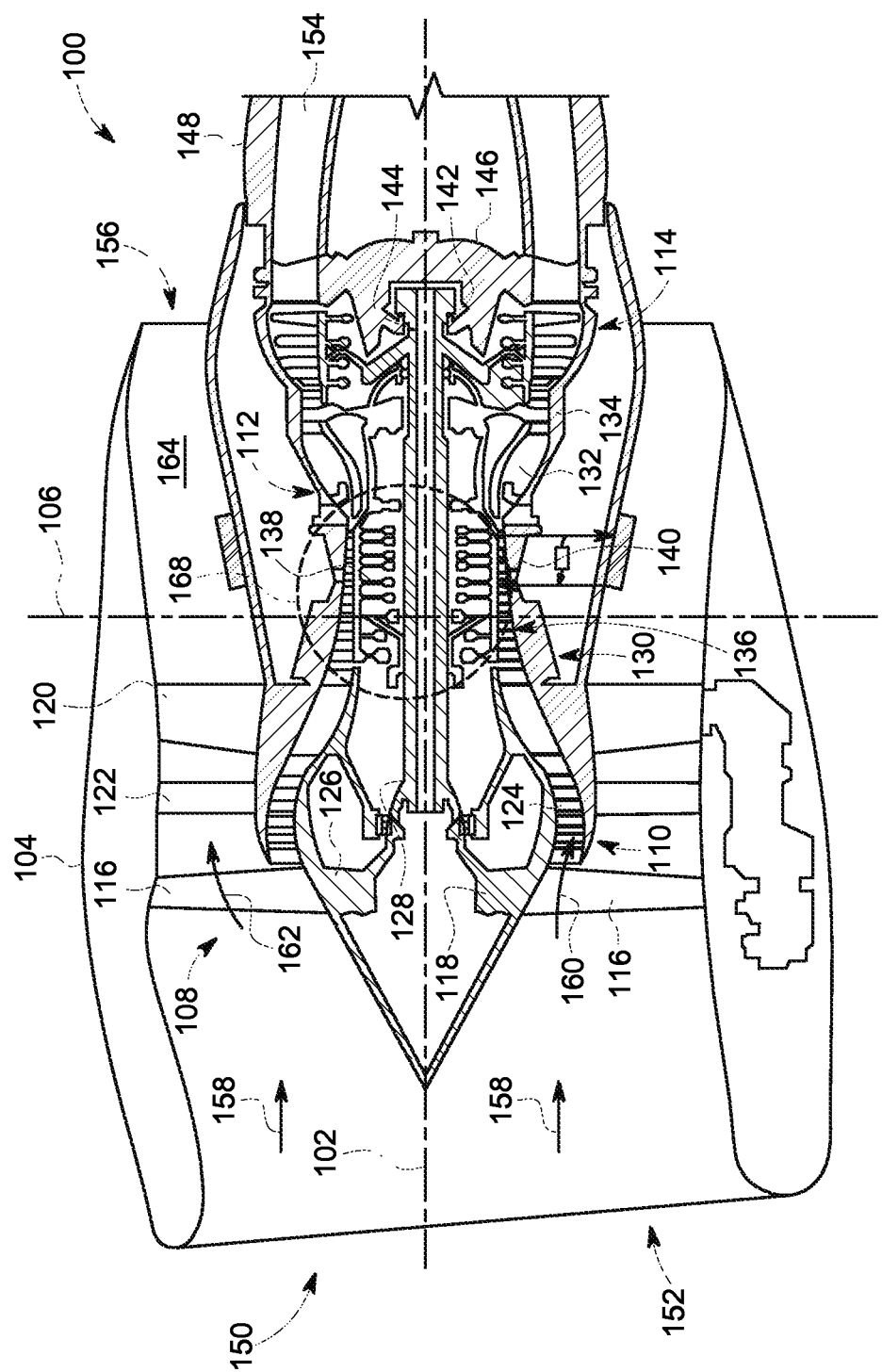
FIG. 1 is a schematic cross-sectional view of an engine assembly including a compressor, in accordance with one or more embodiments shown or described herein.

Referring to the drawings wherein identical reference numerals denote the same elements throughout the various views, FIG. 1 depict a schematic illustration of an exemplary engine assembly 100, for example an aircraft engine assembly. The engine assembly 100 has a longitudinal axis 102 and an outer stationary annular fan casing 104 disposed concentrically about and coaxially along the longitudinal axis 102. In addition, the engine assembly 100 has a radial axis 106. In one exemplary embodiment, the engine assembly 100 includes a fan assembly 108, a booster compressor 110, an engine 112, and a low-pressure turbine 114 that may be coupled to the fan assembly 108 and the booster compressor 110.

The fan assembly 108 includes a plurality of rotor fan blades 116 that extend substantially radially outward from a fan rotor disk 118 and outlet guide blades (OGVs) 120 for providing aerodynamic function, positioned downstream of the rotor fan blades 116. Further, the fan assembly 108 includes a plurality of structural strut members 122 for providing structural support. In this example, separate members are used for providing the aerodynamic function and structural support to the outer stationary annular fan casing 104. In other configurations, the OGVs 120 may provide both aerodynamic function and structural support for the outer stationary annular fan casing 104. The booster compressor 110 includes a plurality of rotor blades 124 that extend substantially radially outward from a compressor rotor disk or hub 126 coupled to a first drive shaft 128. The engine 112 includes a compressor 130, a combustor 132, and a turbine 134. In the illustrated embodiment, the compressor 130, the combustor 132, and the turbine 134 are configured in a downstream axial flow relationship. The compressor 130 includes a flow path (not labeled in FIG. 1) and a plurality of blades 136 positioned in the flow path, particularly, formed in a hub 138 and a casing 140 of the compressor 130. The plurality of blades 136 may include a rotor blade (not shown in FIG. 1) that may extend substantially radially outward from the hub 138 and a stator blade (not shown in FIG. 1) that may extend substantially radially inward from the casing 140. In one embodiment, the stator blade may be integral part of the casing 140 or may be coupled to the casing 140 via a suitable coupling means such as a cantilever, a hook, and the like. The compressor 130 and the turbine 134 are coupled together by a second drive shaft 142. The first and second drive shafts 128, 142 are rotatably mounted in bearings 144 which are mounted in a fan frame 146 and a turbine rear frame 148. The engine assembly 100 also includes an intake side 150, defining a fan intake 152, an exhaust side 154, and a fan exhaust side 156. In one or more embodiments, the compressor 130 disposed upstream relative to the combustor 132, includes an endwall treatment (not shown in FIG. 1) formed in the casing 140 and the hub 138. As illustrated in the embodiment of FIG. 1, the compressor 130 may be used in the aircraft engine. In certain other embodiments, the compressor 130 may be used in power generation applications, power and water industries, oil and gas refining industries, oil and gas production industries, and a stand-alone compressor without deviating from the scope of the present invention. The compressor 130 is explained in greater detail below.

During operation of the engine assembly 100, the fan assembly 108 compresses a fluid flow 158 entering the engine assembly 100 through the intake side 150. The fluid flow 158 exiting the fan assembly 108 is split such that a first portion 160 of the fluid flow 158 is channeled into the booster compressor 110, as a compressed fluid flow, and a second portion 162 of the fluid flow 158 bypasses the booster compressor 110 and the engine 112 and exits the engine assembly 100 via a bypass duct 164, through the fan exhaust side 156 as a bypass fluid flow. The plurality of rotor fan blades 124 is configured to compress and deliver the first portion 160 towards the engine 112. Furthermore, the compressed first portion 160 (i.e. fluid flow) is further compressed by the compressor 130 and is delivered to the downstream combustor 132. Moreover, the fluid flow 160 from the combustor 132 drives the rotating turbine 134 and the low-pressure turbine 114 and exits the engine assembly 100 through the engine exhaust side 146.

Figure 2:
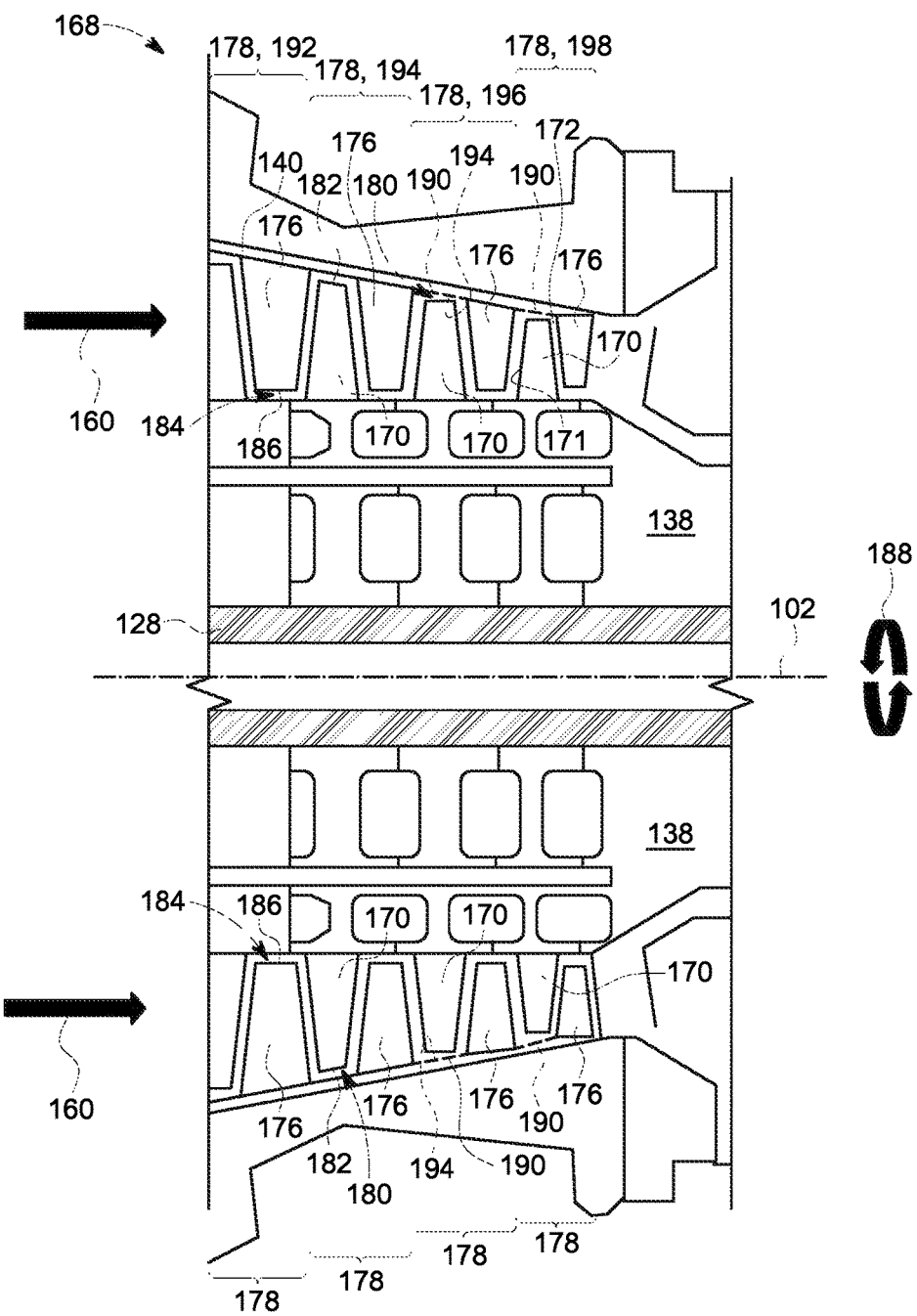
FIG. 2 is a schematic cross-sectional view of a portion of the engine assembly of FIG. 1, and more specifically a portion of the compressor including an endwall treatment formed in a casing of the compressor, in accordance with one or more embodiments shown or described herein.

FIG. 2 illustrates an schematic sectional view of a portion 168 of the compressor 130, as indicated by a dashed line in FIG. 1, having an endwall treatment 190 formed in the casing 140 on each of the last two stages of the compressor 130 in accordance to one exemplary embodiment of the present invention. The portion 168 of the compressor includes a plurality of rotor blades 170 and a plurality of stator blades 176 (of which only a single stator blade is shown). Each rotor blade among the plurality of rotor blades 170 is circumferentially spaced around the compressor hub 138 and extends primarily in a radially outward direction (not labeled in FIG. 2) towards the compressor casing 140 from the compressor hub 138. Similarly, each stator blade among the plurality of stator blades 176 is circumferentially spaced around the compressor casing 140 and extends primarily in a radially inward direction (not labeled in FIG. 2) to interface with the compressor hub 138. Each stator blade 176 is positioned adjacent to each rotor blade 170, and in combination form one of a plurality of axially extending stages 178 of the compressor 130. The plurality of rotor blades 170 is circumscribed by the compressor casing 140, such that an annular gap 180 is defined between the compressor casing 140 and a tip 182 of each rotor blade 170. Likewise, the plurality of stator blades 176 is disposed relative to the compressor hub 138 such that an annular gap 184 is defined between the compressor hub 138 and a tip 186 of each stator blade 176.

The endwall treatments 190 are formed in the casing 140 in the rear stages of the compressor 130, and more particularly in the last two stages 178 of the compressor 130. In the illustrated portion of compressor 130, the compressor stages include stages 192, 194, 196, 198. The last two stages 196 and 198 contain the endwall treatments 190, and may be described herein as the two downstream most stages, two rear most stages or the last two stages of the plurality of stages 178 of the compressor 130 The remaining stages of the plurality of compressor stages 178 located upstream of the two downstream most stages 196, 198 are devoid of any endwall treatment. The last two stages 196 and 198 of the compressor 130 may include any type of known endwall casing treatment geometry, such as, but not limited to circumferential grooves, axial grooves, and the like as known in the art. In an alternate embodiment, the last three stages 194, 196 and 198 contain the endwall treatments 190, and may be described herein as the three downstream most stages, three rear most stages or the last three stages of the plurality of stages 178 of the compressor 130. The physical mechanisms responsible for increasing stall margin with the endwall treatments 190 are twofold. Firstly, the endwall treatments 190 reduce the blockage within a blade passage, or flow path, 172 by eliminating low momentum fluids. Secondly, the endwall treatments 190 have the effect of increasing the dynamic pressure before a rotor leading edge 171 due to recirculating flows across the endwall treatments 190. The endwall treatments 190, however, increase aerodynamic loss mainly due to the mixing between the recirculating flows and the main flow and due to additional work done in compressing recirculating fluid twice.

In an embodiment, the endwall treatments 190 may include multiple flow axes as discussed in U.S. patent application Ser. No. 14/556,315, G. Jothiprasad et al., "Compressor Endwall treatment with Multiple Flow Axes", filed Dec. 1, 2014, assigned to the same assignee and incorporated by reference herein in its entirety. In an embodiment, the endwall treatments 190 may include a means for controlling leakage flow as discussed in U.S. patent application Ser. No. 14/556,452, S. Yoon et al., "Axial Compressor Endwall Treatment for Controlling Leakage Flow Therein", filed Dec. 1, 2014, assigned to the same assignee and incorporated by reference herein in its entirety. In an embodiment, the endwall treatments 190 may include a bent profile as discussed in PCT patent application Ser. No. PCT/US14/69433, M. Ramakrishna et al., "Compressor Endwall Treatment Having a Bent Profile", filed Dec. 10, 2014, assigned to the same assignee and incorporated by reference herein in its entirety. In an embodiment, the endwall treatments 190 may include circumferentially varying treatment for controlling leakage flow therein as discussed in U.S. patent application Ser. No. 14/572,119, D. Giache et al., "Circumferential Varying Axial Compressor Endwall Treatment for Controlling Leakage Flow Therein", filed Dec. 16, 2014, assigned to the same assignee and incorporated by reference herein in its entirety.

By altering the geometry of the compressor casing 140 for the last two rotor stages 196, 198 there is competitive advantage of higher operability range in extreme weather conditions (super-cooled water droplets in convective clouds, hail, ice, rain, etc.). The proposed novel application of the endwall treatments 190 in the last two stages 196, 198 of the compressor 130, while the remaining stages of the plurality of compressor stages 178 located upstream of the two downstream most stages 196, 198 are devoid of any endwall treatment, provides increased stall margin in case of icing events. The proposed novel application of the endwall treatments 190 in the last two stages 196, 198 of the compressor 130 provides an additional benefit of increased stall margin in dry conditions as well.

In the illustrated embodiment, the compressor 130 is an axial flow compressor. In certain other embodiments, suitable compressor 130 may include a centrifugal compressor, a reciprocating compressor, a screw compressor, a rotary compressor, and the like. The application of the endwall treatments 190 in the last two stages 196, 198 of the compressor 130, as illustrated herein, may be used in any such suitable compressor without deviating from the scope of the present disclosure.

In one embodiment, the endwall treatments 190 face the tip 182 of each blade 176 in the last two stages 196, 198 of the compressor 130. As illustrated, in this particular embodiment, the endwall treatments 190 are formed into an interior surface 174 of the casing 140 and disposed circumferentially thereabout proximate to the tip 182 of the rotor blades 170 in the last two stages 196, 198 of the compressor 130.

During operation of the compressor 130, the tip 182 of each rotor blade 170 in the last two stages 196, 198 of the compressor 130 and the endwall treatment 190 in the last two stages 196, 198 of the compressor 130 are configured to move relative to each other. Specifically, the hub 138 is configured to rotate about the axial direction 188 so that a fluid flow 158 is generally along the principal direction (i.e. the longitudinal axis 102) of the engine assembly 100 (FIG. 1). As illustrated, in an embodiment the remaining rotor stages 192, 194 and any additional rotor stages, located upstream of the last two stages 196, 198, are devoid of any endwall treatments, meaning they do not include any endwall treatments in the casing 140.

In certain embodiments, the endwall treatment 190 may be formed separately and may be coupled to the casing 140 without deviating from the scope of the present disclosure. In certain embodiments, the endwall treatment 190 may be embedded in the casing 140 without deviating from the scope of the present disclosure.

Figure 3:
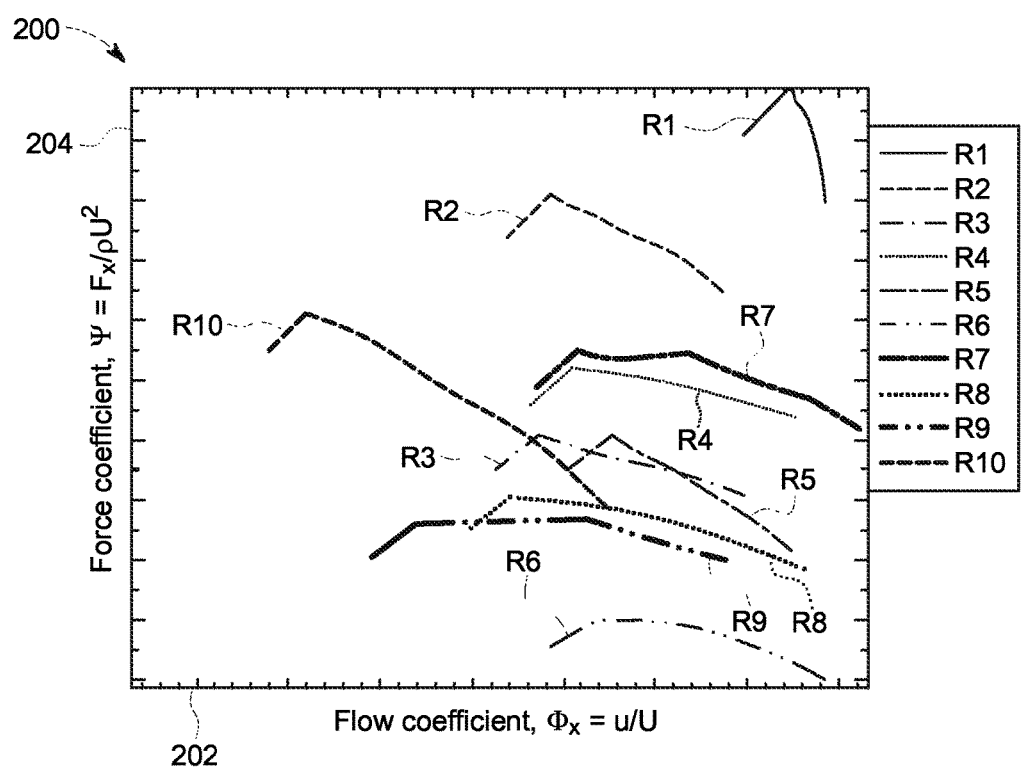
FIG. 3 is a graphical representation illustrating a traditional compressor without an endwall treatment illustrating a pressure rise coefficient versus an axial flow coefficient.

Illustrated in FIGS. 3-6 are exemplary graphical representations showing the benefit of the compressor 130 including the endwall treatment 190 on the last two stages 196, 198 as disclosed herein, and more particularly when applied to a modern axial compressor. Referring more specifically to FIG. 3, illustrated in the exemplary graphical representation, generally referenced 200, is the pressure rise coefficient (plotted on axis 202) as a function of axial flow coefficient (plotted in axis 204) for different compressor stages numbered R1-R10 which represents stage stacking in a known multi-stage axial compressor, and more particularly a 10-stage compressor with baseline geometry and no endwall treatment. Graph 200 illustrates the force coefficient (axial pressure and momentum rise across rotor normalized with wheel dynamic head) vs. flow coefficient (axial speed normalized with wheel speed) for the baseline geometry of a known multi-stage axial compressor. Lines with positive slope depict numerical stall lines for the stages.

Figure 4:
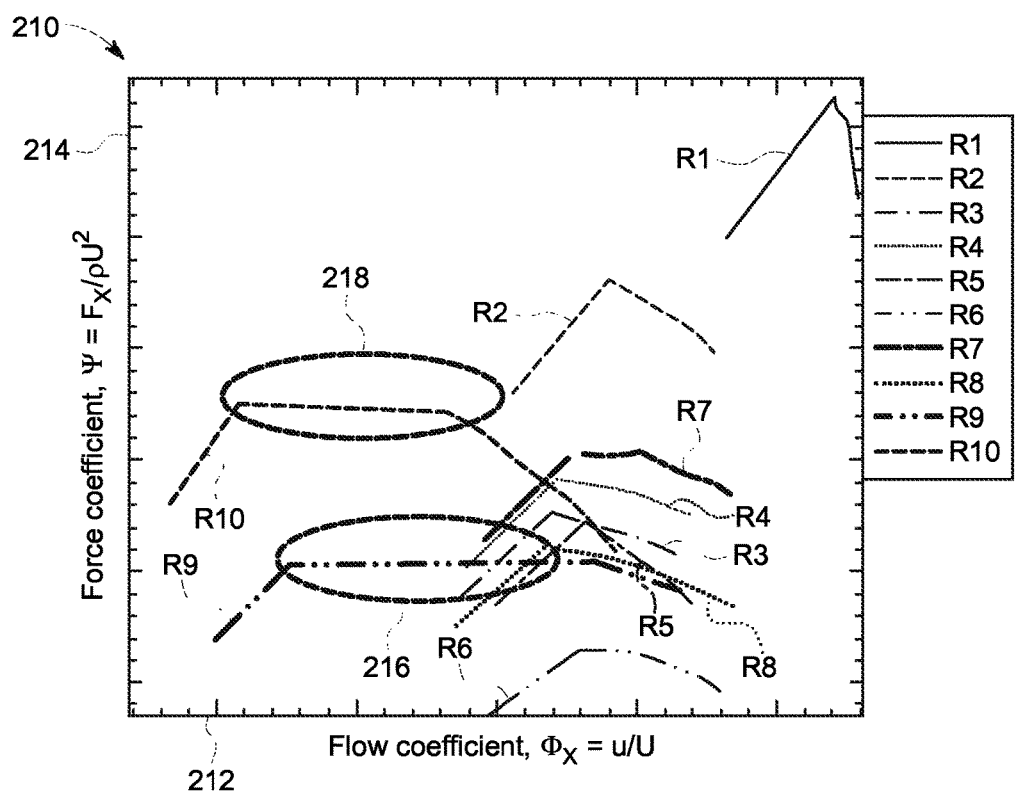
FIG. 4 is a graphical representation illustrating a pressure rise coefficient versus an axial flow coefficient in a compressor including an endwall treatment as disclosed in accordance with one or more embodiments shown or described herein.

Referring more specifically to FIG. 4, illustrated in the exemplary graphical representation, generally referenced 210, is the pressure rise coefficient (plotted on axis 212) as a function of axial flow coefficient (plotted in axis 214) for the compressor stages R1-R10 which represents stage stacking in a multi-stage axial compressor, the compressor including endwall treatments on the last two stages (R9 and R10), such as compressor 130 described herein. Icing simulations were performed on baseline compressor characteristics (FIG. 3) by ingested ice at a steady increasing rate of ice flow. In graph 210, endwall treatments were applied to the rotor 9 and rotor 10 casings to obtain resultant extended stall margin as shown in FIG. 4. The extended map of rotor 9 is indicated in dashed circle 216 and the extended map of rotor 10 is indicated in dashed circle 218.

Figure 5:
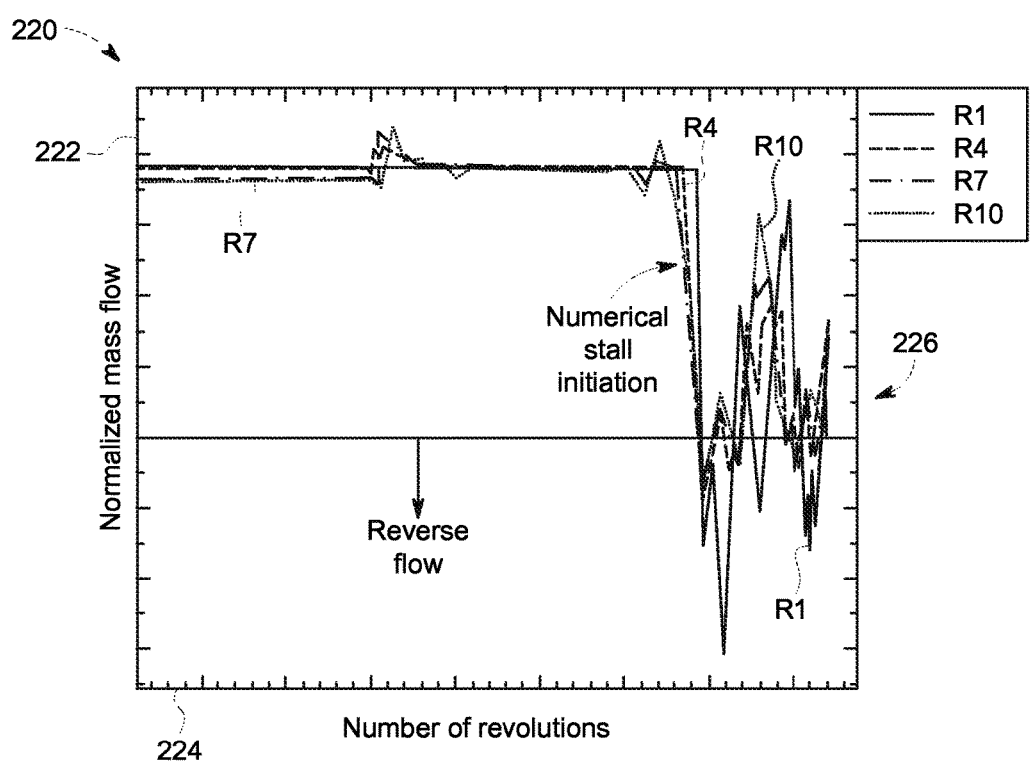
FIG. 5 is a graphical representation illustrating the air mass flow rate at each rotor inlet as a function of time in a compressor including an endwall treatment as disclosed in accordance with one or more embodiments shown or described herein.

Referring more specifically to FIG. 5, illustrated in the exemplary graphical representation of numerical stall within a compressor under icing conditions having baseline geometry with and without the endwall treatment. More specifically, the graphical representation, generally referenced 220, represents an air mass flow rate with respect normalized against its dry value (plotted on axis 222) shown at each rotor inlet for stages R1, R4, R7 and R10, as a function of rotor revolutions (plotted in axis 224). Numerical stall signature can be seen by a drop in mass flow rate stage starting from rear stage (stage 10 in this case) and instability moving upstream to stage 1. As noted, the compressor stalled at an ice ingestion rate of equivalent specific humidity (SH=mass of ice/mass of air) of 2.32% at the compressor inlet as shown by high amplitude oscillations as indicated at 226.

FIGS. 6 and 7 demonstrate the benefit of using casing treatments on the last two stages, such as casing treatments 190, in increasing the icing stall margin. Referring more specifically to FIG. 6, illustrated in the exemplary graphical representation is an icing stall simulation results using the compressor characteristics map from FIG. 4, and more particularly using a compressor having endwall treatments on the last two compressor stages, such as in compressor 130 described herein. More specifically, the graphical representation, generally referenced 230, represents an air mass flow rate with respect to its dry value (plotted on axis 232) shown at each rotor inlet R1-R10, as a function of rotor revolutions (plotted in axis 234). The ice ingestion rate of the compressor was increased every 5 revolutions. As noted, the compressor stalls at an ice ingestion rate of equivalent specific humidity (SH=mass of ice/mass of air) of 3.63% at the compressor inlet as shown by high amplitude oscillations as indicated at 236. In the illustrated date, it was shown that in the presence of endwall treatments, stall occurred at SH=3.63% which is nearly 50% higher ice ingestion rate as compared to a compressor with baseline geometry.

Referring more specifically to FIG. 7, illustrated in the exemplary graphical representation, generally referenced 240, is the transient compressor stage behavior, illustrated by plotting the pressure rise coefficient (plotted on axis 242) as a function of axial flow coefficient (plotted in axis 244) for stages R8, R9 and R10 in a multi-stage axial compressor including endwall treatments on the last two stages, such as compressor 130 described herein. More specifically, illustrated is transient compressor stage-matching due to icing on last three stage rotors R8, R9 and R10. Matching of stages R8, R9 and R10 enables stable operation over a large range of mass flows and operating conditions of R8, as indicated at 246, of R9, as indicated at 248 and at R10, as indicated at 250. As illustrated, the last two stages, R9 and R10, are loaded in the presence of icing and can operate at moist air with higher humidity due to extended stall margin.

Accordingly, as disclosed herein and as illustrated in FIGS. 1-7, provided are various technological advantages and/or improvements over existing baseline compressor geometries that delay compressor stall due to engine icing. As disclosed, the endwall treatments on the last two stages of a compressor, and wherein the remaining compressor stages located upstream of the two downstream most stages are devoid of any endwall treatment, provides an increase in stall margin, without the loss in efficiency in a compressor. The proposed endwall treatments, disposed along the circumferential direction of the compressor on the last two rotor stages, as disclosed herein, have the potential to provide higher stall margins and operability range of the compressor.

During both analytic and test investigation of compressor ice ingestion, it was found that the aerodynamic stage loading migrates to the rear stages. As a result, enhanced ice ingestion capability was provided by adding a casing treatment to these rear stages to extend their range and improve their characteristics' slope. Numerical simulations have shown that compressor configuration disclosed herein can tolerate approximately 50% more ice as compared to its baseline configuration before stalling, giving it an approximate 40-50% icing stall margin benefit. The disclosed compressor configuration additionally alleviates the use of the TBV, thus providing high operability margin during icing conditions. By altering the casing geometry for select stages of the existing compressor, the compressor disclosed herein provides a competitive advantage of higher operability range in extreme weather conditions (super-cooled water droplets in convective clouds, hail, ice, rain) as well as an extended stall margin in dry weather conditions making rear stages less susceptible to stall.

Exemplary embodiments of an axial compressor having the endwall treatment on the last two stages are described in detail above. Although the endwall treatment has been described with reference to an axial compressor, the endwall treatment as described above may be used in any axial flow system, including other types of engine apparatus that include a compressor, and particularly those in which an increase in stall margin is desired. In addition, the endwall treatment may be included on additional downstream/rear stages to maximize icing stall margin benefit. Other applications will be apparent to those of skill in the art. Accordingly, the axial compressor endwall treatment and method of delaying the stall margin as disclosed herein is not limited to use with the specified engine apparatus described herein. Moreover, the present disclosure is not limited to the embodiments of the axial compressor described in detail above. Rather, other variations of the axial compressor including endwall treatment embodiments may be utilized within the spirit and scope of the claims.

While only certain features of embodiments have been illustrated and described herein, many modifications and changes will occur to those skilled in the art. It is, therefore, to be understood that the appended embodiments are intended to cover all such modifications and changes as falling within the spirit of the technology.

The invention claimed is:

1. A compressor comprising:
   a casing;
   a hub;
   a flow path formed between the casing and the hub;
   a plurality of blades positioned in the flow path and defining a plurality of axially extending compressor stages; and
   an endwall treatment formed in the casing on at least two downstream most stages of the plurality of compressor stages, each of the endwall treatments facing a tip of each blade in the at least two downstream most stages, wherein the tip of each blade and the endwall treatment are configured to move relative to each other,
   wherein the remaining stages of the plurality of compressor stages located upstream of the at least two downstream most stages are devoid of any endwall treatment, and
   wherein the endwall treatments are configured to extend a stall margin to delay stall due to ice ingestion.

2. The compressor of claim 1, wherein each of the endwall treatments include a geometrical modification of the casing.

3. The compressor of claim 2, wherein each of the endwall treatments is formed into an interior surface of the casing and disposed circumferentially thereabout.

4. The compressor of claim 2, wherein each of the endwall treatments is formed separately and coupled to the casing and disposed circumferentially thereabout.

5. The compressor of claim 2, wherein each of the endwall treatments is embedded in the casing and disposed circumferentially thereabout.

6. The compressor of claim 1, wherein each of the endwall treatments includes one of axial grooves or circumferential grooves or a combination of both.

7. The compressor of claim 2, wherein the endwall treatment on each of the at least two downstream most stages of the plurality of compressor stages are the same.

8. The compressor of claim 1, wherein the endwall treatment is formed in the casing on three downstream most stages of the plurality of compressor stages.

9. A method comprising:
   introducing a fluid flow along a flow path formed between a casing and a hub of a compressor, wherein the compressor further comprises a plurality of blades positioned in the flow path and defining a plurality of axially extending compressor stages; and
   extracting a portion of the fluid flow into an endwall treatment formed in the casing of each of at least two rear stages of the plurality of compressor stages, each of the endwall treatments facing a corresponding tip of each blade in the two rear stages,
   wherein the tip of each blade and the corresponding endwall treatment are configured to move relative to each other,
   wherein the remaining stages of the plurality of compressor stages located upstream of the at least two rear stages are devoid of any endwall treatment, and
   wherein the endwall treatments are configured to extend a stall margin to delay stall due to ice ingestion.

10. The method of claim 9, wherein each of the endwall treatments include a geometrical modification of the casing.

11. The method of claim 10, wherein each of the endwall treatments is formed into an interior surface of the casing and disposed circumferentially thereabout.

12. The method of claim 10, wherein each of the endwall treatments is formed separately and coupled to the casing and disposed circumferentially thereabout.

13. The method of claim 10, wherein each of the endwall treatments is embedded in the casing and disposed circumferentially thereabout.

14. The method of claim 9, wherein the endwall treatment on each of the at least two downstream most stages of the plurality of compressor stages are the same.

15. The method of claim 9, wherein the endwall treatment is formed in the casing on three downstream most stages of the plurality of compressor stages.

16. An engine comprising:
   a compressor;
   a combustor; and
   a turbine, wherein the compressor, the combustor, and the turbine are configured in a downstream axial flow relationship, the compressor comprising:
   a casing;
   a hub;
   a flow path formed between the casing and the hub;
   a plurality of blades positioned in the flow path and defining a plurality of compressor stages extending axially;
   an endwall treatment formed in the casing on a downstream most stage of the plurality of compressor stages, wherein the endwall treatment faces a tip of the blade in the downstream most stage, the endwall treatment and blades configured to move relative to each other; and
   an endwall treatment formed in the casing on a compressor stage immediately upstream from the downstream most stage of the plurality of compressor stages, wherein the endwall treatment faces a tip of the blade in the stage immediately upstream from the downstream most stage, the endwall treatment and blades configured to move relative to each other, wherein the remaining stages of the plurality of compressor stages located upstream of the stage immediately upstream from the downstream most stage are devoid of any endwall treatment, and wherein the endwall treatments are configured to extend a stall margin to delay stall due to ice ingestion.

17. The engine of claim 16, wherein each of the endwall treatments include a geometrical modification of the casing.

18. The engine of claim 16, wherein each of the endwall treatments is one of formed into an interior surface of the casing and disposed circumferentially thereabout, formed separately and coupled to the casing and disposed circumferentially thereabout, or embedded in the casing and disposed circumferentially thereabout.

19. The engine of claim 16, wherein the endwall treatments are the same.

20. The engine of claim 16, further comprising an endwall treatment formed in the casing on a compressor stage immediately upstream from the compressor stage immediately upstream from the downstream most stage of the plurality of compressor stages, wherein the endwall treatment faces a tip of the blade in the stage immediately upstream from the compressor stage immediately upstream from the downstream most stage, the endwall treatment and blade configured to move relative to each other.

* * * * *